US012680609B2

(12) United States Patent
Allmann et al.

(10) Patent No.: US 12,680,609 B2
(45) Date of Patent: Jul. 14, 2026

(54) OUTPUT ASSEMBLY FOR DRIVING A DRIVE PULLEY OF A CONTINUOUSLY VARIABLE TRANSMISSION AND FOR SUPPLYING HYDRAULIC FLUID TO THE DRIVE PULLEY FOR ACTUATING THE DRIVE PULLEY

(71) Applicant: BRP-ROTAX GMBH & CO. KG, Gunskirchen (AT)

(72) Inventors: Paul Allmann, Linz (AT); Giacomo Riva, Wels (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 19/173,382

(22) Filed: Apr. 8, 2025

(65) Prior Publication Data

US 2025/0334177 A1     Oct. 30, 2025

Related U.S. Application Data

(60) Provisional application No. 63/640,288, filed on Apr. 30, 2024.

(51) Int. Cl.
*F16H 61/662*     (2006.01)
*F16H 55/56*     (2006.01)

(52) U.S. Cl.
CPC ........... *F16H 61/662* (2013.01); *F16H 55/56* (2013.01)

(58) Field of Classification Search
CPC ....... F16H 61/662; F16H 55/56; F16H 63/065
See application file for complete search history.

(56) References Cited

U.S. PATENT DOCUMENTS

| | | | | |
|---|---|---|---|---|
| 3,793,871 A | * | 2/1974 | Kinghorn | B21D 24/04 72/349 |
| 4,494,943 A | * | 1/1985 | Takei | F16H 37/021 474/18 |
| 4,560,369 A | * | 12/1985 | Hattori | F16H 37/021 474/28 |
| 5,439,419 A | * | 8/1995 | Yamada | F16H 63/065 474/18 |
| 5,607,371 A | * | 3/1997 | Yamaguchi | F16H 57/04 475/210 |
| 5,711,730 A | * | 1/1998 | Friedman | F16H 61/66259 474/18 |
| 6,210,103 B1 | * | 4/2001 | Ramsay | F16J 15/406 415/230 |

(Continued)

*Primary Examiner* — Henry Y Liu

(74) *Attorney, Agent, or Firm* — BCF LLP

(57)     ABSTRACT

An output assembly for driving a drive pulley of a continuously variable transmission and for supplying hydraulic fluid thereto is disclosed. The output assembly has a shaft configured to connect to a motor output shaft and to the drive pulley; a cover surrounding a portion of the shaft; a bearing rotationally supporting the shaft in the cover; and a sleeve and two shaft seals disposed between the cover and the shaft. In operation: hydraulic fluid flows from a cover inlet passage to a first high pressure chamber defined between the cover and the sleeve, through a sleeve passage from the first high pressure chamber to a second high pressure chamber defined between the sleeve and the shaft, and from the second high pressure chamber to the drive pulley via a shaft passage and to a cover outlet passage via a low pressure chamber defined between the cover and the shaft.

20 Claims, 14 Drawing Sheets

(56) References Cited

U.S. PATENT DOCUMENTS

| | | | | |
|---|---|---|---|---|
| 6,361,470 | B1* | 3/2002 | Friedmann | F16H 61/66272 477/45 |
| 7,281,596 | B2* | 10/2007 | Fukuda | F16H 57/0489 474/144 |
| 7,811,187 | B2* | 10/2010 | Koyama | F16H 63/065 474/46 |
| 8,371,972 | B2* | 2/2013 | Sugitani | F16H 63/062 474/43 |
| 8,645,035 | B2* | 2/2014 | Rioux | F16H 61/66272 701/61 |
| 8,798,882 | B2* | 8/2014 | Monfette | F16H 61/66259 701/61 |
| 8,998,755 | B2* | 4/2015 | Monfette | F16H 9/18 474/18 |
| 9,017,193 | B2* | 4/2015 | Kadokawa | F16H 55/56 474/8 |
| 9,109,694 | B2* | 8/2015 | Lafreniere | F16H 63/065 |
| 11,754,151 | B2* | 9/2023 | Kuroki | F16H 9/18 474/28 |
| 2004/0094343 | A1* | 5/2004 | Fukuda | F16H 57/0415 180/68.2 |
| 2005/0153805 | A1* | 7/2005 | Koyama | F16H 61/66272 474/18 |
| 2008/0190673 | A1* | 8/2008 | Sugitani | F16H 55/56 474/166 |
| 2012/0178561 | A1* | 7/2012 | Lafreniere | F16H 55/56 474/28 |
| 2012/0178562 | A1* | 7/2012 | Monfette | F16H 9/18 474/28 |
| 2012/0179344 | A1* | 7/2012 | Rioux | F16H 61/66259 701/61 |
| 2013/0080007 | A1* | 3/2013 | Monfette | B60W 10/107 701/61 |
| 2013/0178316 | A1* | 7/2013 | Kadokawa | F16H 57/035 474/8 |
| 2014/0011616 | A1* | 1/2014 | Ijichi | F16H 55/56 474/45 |
| 2020/0400222 | A1* | 12/2020 | Yudell | F16D 7/027 |
| 2021/0254688 | A1* | 8/2021 | Kuroki | F16H 63/065 |

* cited by examiner

OUTPUT ASSEMBLY FOR DRIVING A DRIVE PULLEY OF A CONTINUOUSLY VARIABLE TRANSMISSION AND FOR SUPPLYING HYDRAULIC FLUID TO THE DRIVE PULLEY FOR ACTUATING THE DRIVE PULLEY

CROSS-REFERENCE

The present application claims priority to U.S. Provisional Patent Application No. 63/640,288, filed Apr. 30, 2024, the entirety of which is incorporated herein by reference.

TECHNICAL FIELD

The present technology relates to output assemblies for driving drive pulleys of continuously variable transmissions and for supplying hydraulic fluid to the drive pulleys for actuating the drive pulleys.

BACKGROUND

Many vehicles incorporate a continuously variable transmission (CVT) having a drive pulley that is operatively coupled to the engine crankshaft and a driven pulley coupled to a driven shaft.

In some embodiments, the drive pulley includes a centrifugally actuated adjusting mechanism through which the drive ratio of the CVT is varied progressively as a function of the engine speed and the output torque at the driven pulley. This is known as a centrifugal CVT.

Although a centrifugal CVT provides many advantages, the fact that the drive ratio of the CVT is directly related to the engine speed causes some disadvantages. One such disadvantage is that the calibration of the drive pulley is always linked with the maximum power output of the engine. Although this provides great acceleration characteristics for the vehicle, when the vehicle operates at cruising speeds, it can result in the engine operating at a greater speed than necessary, high fuel consumption, high noise levels, and a lot of vibrations being transmitted to the rider of the vehicle.

One alternative is known as a hydraulic CVT. In a hydraulic CVT, the drive pulley defines one or more hydraulic chambers. Hydraulic fluid is supplied to the one or more hydraulic chambers to move a movable sheave of the drive pulley toward a fixed sheave of the drive pulley. To move the movable sheave away from the fixed sheave, a spring is provided in the drive pulley and/or hydraulic fluid is supplied to one or more other hydraulic chambers. As such, the drive ratio of the hydraulic CVT can be adjusted independently of the speed of rotation to the engine.

In some hydraulic CVT, the hydraulic fluid used is the engine lubricant that is also used to lubricate the various components of the engine. The engine lubricant is drawn from the engine's lubricant reservoir and is supplied to the drive pulley. Although this provides adequate operation of the drive pulley, engine lubricant is not ideal for providing the high pressure required to operate the drive pulley.

One solution consists in providing a hydraulic circuit for the operation of the drive pulley that is independent from the lubrication circuit of the engine. As a result, the engine lubricant suitable for high speed operations and high heat environments can be provided in the lubrication circuit of the engine, and hydraulic fluid suitable for high speed and high pressure operations can be provided in the hydraulic circuit for the operation of the drive pulley.

One of the challenges of this solution is that the hydraulic circuit for the operation of the drive pulley has to be sealed from the lubrication circuit of the engine in order to prevent the hydraulic fluid from contaminating the engine lubricant and vice versa. This is particularly challenging for the sealing of the hydraulic circuit for the operation of the drive pulley. Due to the high speed and high pressure operation of the drive pulley, providing adequate seals is difficult. Most seals are either designed for low speed, high pressure operation or for high speed, low pressure operation. Although some seals are designed for high speed, high pressure operation, their cost makes can make their commercial use prohibitive.

Therefore, there is a desire for a way of sealing a hydraulic circuit for the operation of a hydraulic drive pulley that can overcome at least some of the above-described drawbacks.

SUMMARY

It is an object of the present technology to ameliorate at least some of the inconveniences present in the prior art.

According to one aspect of the present technology, there is provided an output assembly for driving a drive pulley of a continuously variable transmission and for supplying hydraulic fluid to the drive pulley for actuating the drive pulley. The output assembly has a shaft defining a rotation axis. The shaft has: a first end configured to connect to an output shaft of a motor for being driven by the output shaft; and a second end configured to connect to the drive pulley for driving the drive pulley. The shaft defines a shaft passage for supplying hydraulic fluid to the drive pulley. The shaft passage has at least one inlet defined in a circumference of the shaft. The output assembly also has a cover surrounding a portion of the shaft, the cover defining a cover inlet passage and a cover outlet passage, the second end of the shaft being disposed outside the cover; a bearing disposed in the cover radially between the cover and the shaft, the bearing rotationally supporting the shaft in the cover; a sleeve disposed in the cover radially between the cover and the shaft, the sleeve being rotationally fixed relative to the cover, the sleeve defining at least one sleeve passage extending from an outside of the sleeve to an inside of the sleeve; a first shaft seal disposed radially between the cover and the shaft; a second shaft seal disposed radially between the cover and the shaft, the second shaft seal being disposed axially between the sleeve and the second end of the shaft, the sleeve being disposed axially between the first shaft seal and the second shaft seal; a first high pressure chamber defined radially between the cover and the sleeve, the cover inlet passage fluidly communicating with the first high pressure chamber; a second high pressure chamber defined radially between the sleeve and the shaft, the at least one sleeve passage fluidly communicating the first high pressure chamber with the second high pressure chamber, the at least one inlet of the shaft passage fluidly communicating with the second high pressure chamber; and a low pressure chamber defined radially between the cover and the shaft and axially between the sleeve and one of the first shaft seal and the second shaft seal, the second high pressure chamber fluidly communicating with the low pressure chamber, the cover outlet passage fluidly communicating with the low pressure chamber. In operation: hydraulic fluid flowing from the cover inlet passage to the first high pressure chamber, and from the first high pressure chamber to the second high pressure chamber via the at least one sleeve passage; a portion of hydraulic fluid in the second high pressure chamber flowing to the shaft passage via the at least one inlet of the shaft passage, and from the shaft passage to the drive pulley; and another portion of hydraulic fluid in the second high pressure chamber flowing to the low pressure chamber, and from the low pressure chamber to the cover outlet passage.

In some embodiments, the shaft passage has: a first shaft passage section coaxial with the rotation axis; and at least one second shaft passage section extending from the at least one inlet of the shaft passage to the first shaft section.

In some embodiments, the shaft passage has an outlet defined at an end of the first shaft passage section; the at least one inlet of the shaft passage is a plurality of inlets; and the at least one second shaft passage section is a plurality of second shaft passage sections.

In some embodiments, the bearing is disposed axially between the sleeve and the second shaft seal.

In some embodiments, the bearing is disposed in the low pressure chamber.

In some embodiments, two sealing rings are disposed radially between the cover and the sleeve. The first high pressure chamber is disposed axially between the two sealing rings.

In some embodiments, two rings are disposed radially between the sleeve and the shaft. The second high pressure chamber is disposed axially between the two rings.

In some embodiments, the low pressure chamber is a second low pressure chamber disposed axially between the sleeve and the second shaft seal. The second high pressure chamber fluidly communicates with the second low pressure chamber. The cover outlet passage fluidly communicates with the second low pressure chamber. The output assembly also has a first low pressure chamber defined radially between the cover and the shaft and axially between the sleeve and the first shaft seal. The second high pressure chamber fluidly communicates with the first low pressure chamber. The cover outlet passage fluidly communicates with the first low pressure chamber. In operation, the other portion of hydraulic fluid in the second high pressure chamber flows to the first low pressure chamber and to the second low pressure chamber, and from the first low pressure chamber and the second low pressure chamber to the cover outlet passage.

In some embodiments, the first low pressure chamber fluidly communicates with the cover outlet passage via the second low pressure chamber.

In some embodiments, the at least one sleeve passage is at least one first sleeve passage; the sleeve defines at least one second sleeve passage extending axially through the sleeve; and the at least one second sleeve passage fluidly communicates the first low pressure chamber with the second low pressure chamber.

In some embodiments, the bearing is disposed in the second low pressure chamber.

In some embodiments, a first ring is disposed radially between the sleeve and the shaft, the first ring being disposed axially between the second high pressure chamber and the first low pressure chamber; and a second ring disposed radially between the sleeve and the shaft, the second ring being disposed axially between the second high pressure chamber and the second low pressure chamber. The second high pressure chamber is disposed axially between the two rings. In operation, the other portion of hydraulic fluid in the second high pressure chamber flows over the first ring to the first low pressure chamber and over the second ring to the second low pressure chamber.

According to another aspect of the present technology, there is provided a motor assembly having: a motor having an output shaft; the output assembly described above, the output shaft being operatively connected to the shaft of the output assembly; and a drive pulley operatively connected to the shaft of the output assembly, the drive pulley defining at least one drive pulley chamber fluidly connected to the shaft passage of the output assembly for receiving hydraulic fluid from the shaft passage.

In some embodiments, a hydraulic fluid reservoir is fluidly connected to the cover outlet passage for receiving hydraulic fluid from the cover outlet passage; and a pump is fluidly connected to the hydraulic fluid reservoir and to the cover inlet passage for pumping hydraulic fluid from the hydraulic fluid reservoir to the cover inlet passage.

In some embodiments, the drive pulley has: a drive pulley shaft operatively connected to the shaft of the output assembly; a fixed sheave fixedly connected to the drive pulley shaft; and a movable sheave connected to the drive pulley shaft and being movable axially along the drive pulley shaft. Hydraulic fluid supplied to the at least one drive pulley chamber from the shaft passage of the output assembly moves the movable sheave toward the fixed sheave.

In some embodiments, the drive pulley also has a spring biasing the movable sheave away from the fixed sheave.

In some embodiments, the output shaft, the shaft of the output assembly and the drive pulley shaft are coaxial.

In some embodiments, the fixed sheave is disposed between the movable sheave and the motor.

In some embodiments, the cover of the output assembly is fastened to the motor.

In some embodiments, the motor is an internal combustion engine; and the output shaft is a crankshaft of the internal combustion engine.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
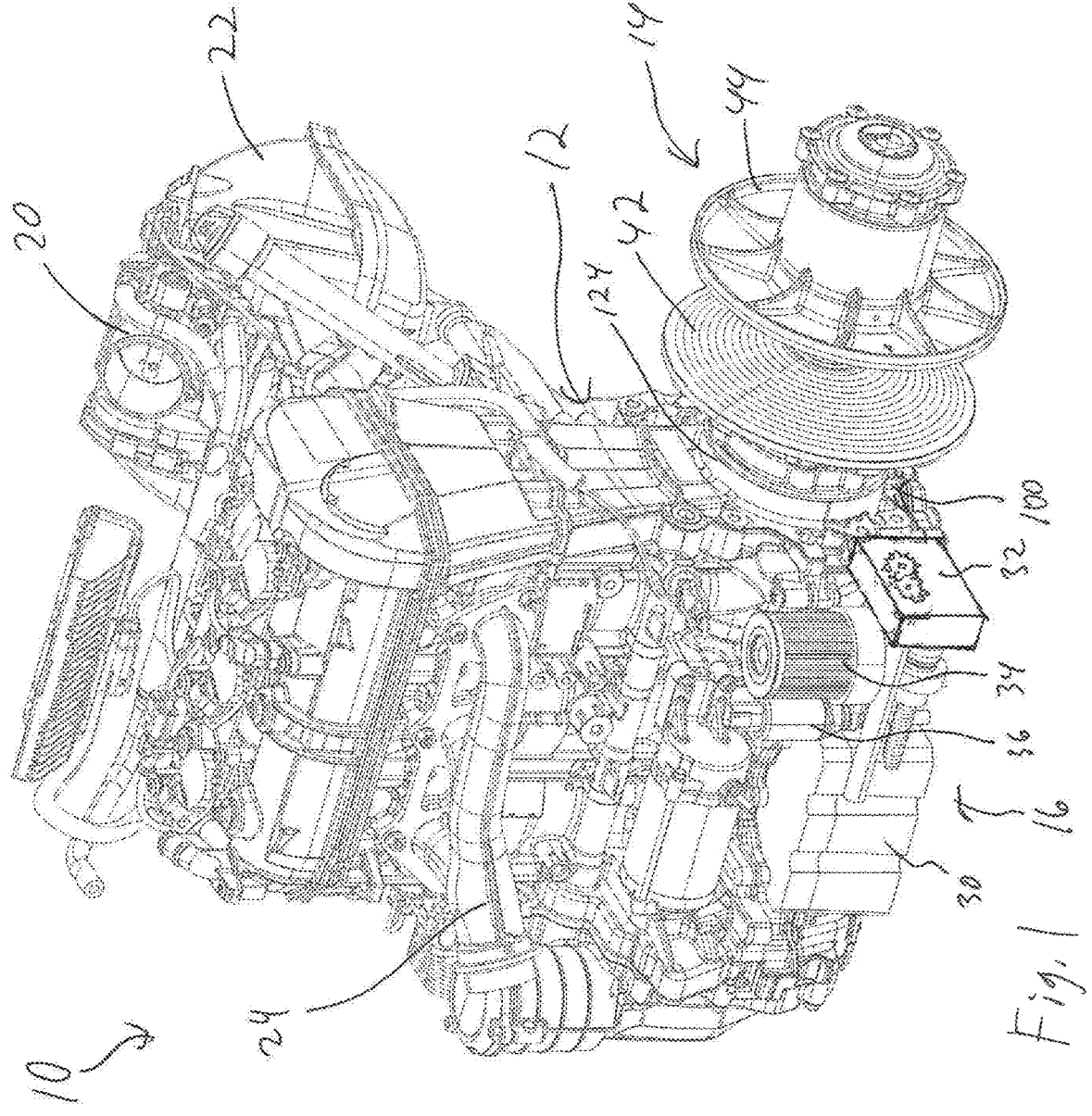
FIG. 1 is a perspective view taken from a front, left side of a motor assembly including an internal combustion engine, an output assembly, and a drive pulley.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

A motor assembly 10 according to the present technology will be described with respect to FIGS. 1 and 2. The motor assembly 10 includes a motor 12, a drive pulley 14, a hydraulic fluid supply system 16 and an output assembly 100. As will be described in more detail below, the output assembly 100 operatively connects the motor 12 to the drive pulley 14, and the output assembly 100 is also used to supply hydraulic fluid to the drive pulley 14.

In the present embodiment, the motor 12 is a four-stroke spark-ignited internal combustion engine (hereinafter the engine 12) having three inline cylinders 18. It is contemplated that the engine 12 could have more or less than three cylinders 18 and that the cylinders 18 could not be disposed inline. It is also contemplated that the engine 12 could operate on a cycle other than the four-stroke cycle, such as the two-stroke cycle for example, or that the engine could be a diesel engine. It is also contemplated that in some embodiments the motor 12 could be an electric motor.

In the present embodiment, an air intake system supplies air to the engine 12 and an exhaust system receives exhaust gases from the engine 12. The air intake system includes, but is not limited to, a throttle body 20 and an intake plenum 22. The throttle body 20 controls the flow of air to the intake plenum 22. The intake plenum 22 is fluidly connected to the three cylinder 18 to supply air to the cylinders 18. The exhaust system includes an exhaust manifold 24. The exhaust manifold 24 receives exhaust gases from the three cylinders 18 and supplies the exhaust gases to the rest of the exhaust system, which could include a muffler for example.

Figure 2:
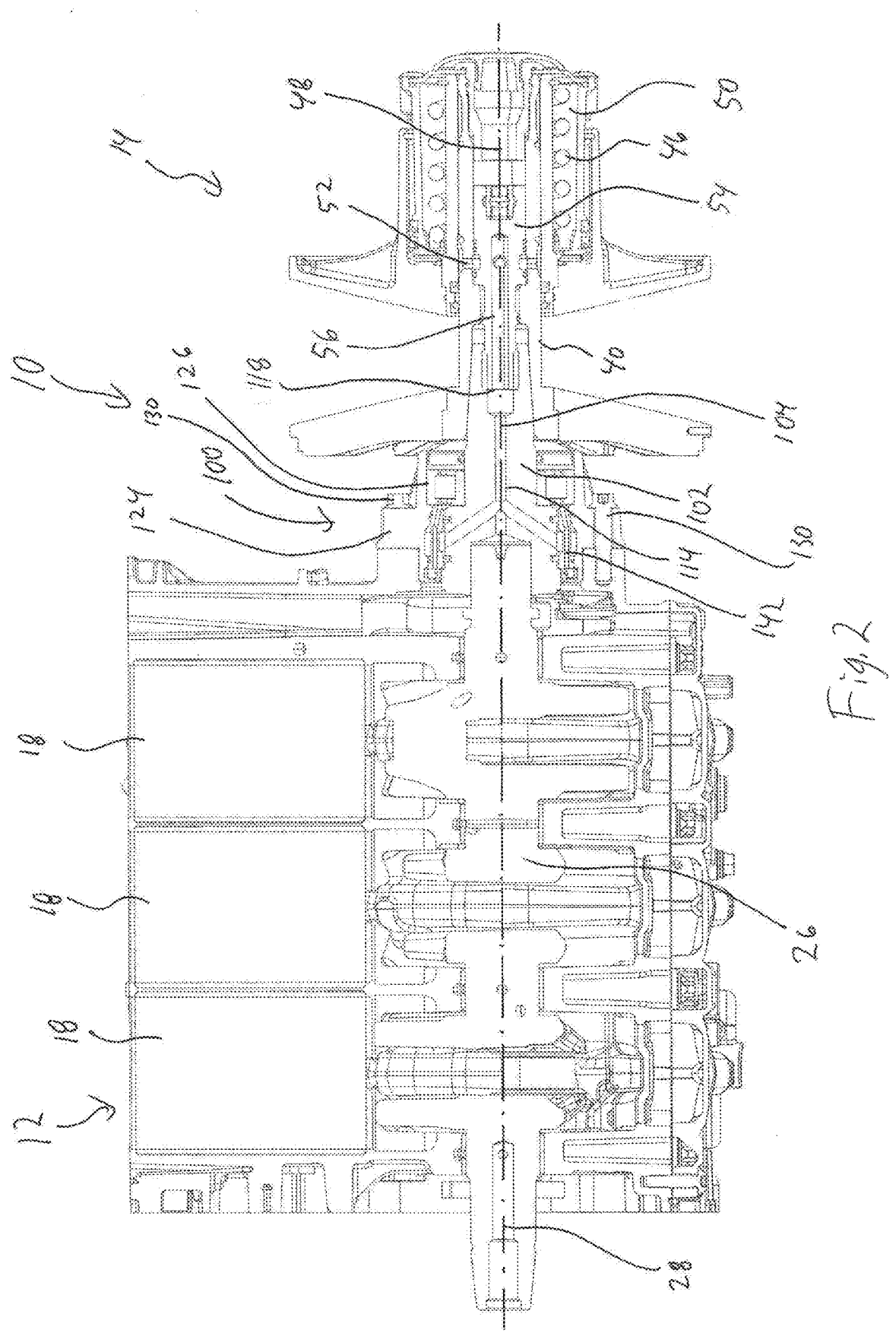
FIG. 2 is a cross-sectional view of the motor assembly of FIG. 1 taken through a vertical plane containing a rotation axis of the engine, with portions of the engine removed.
Figure 3:
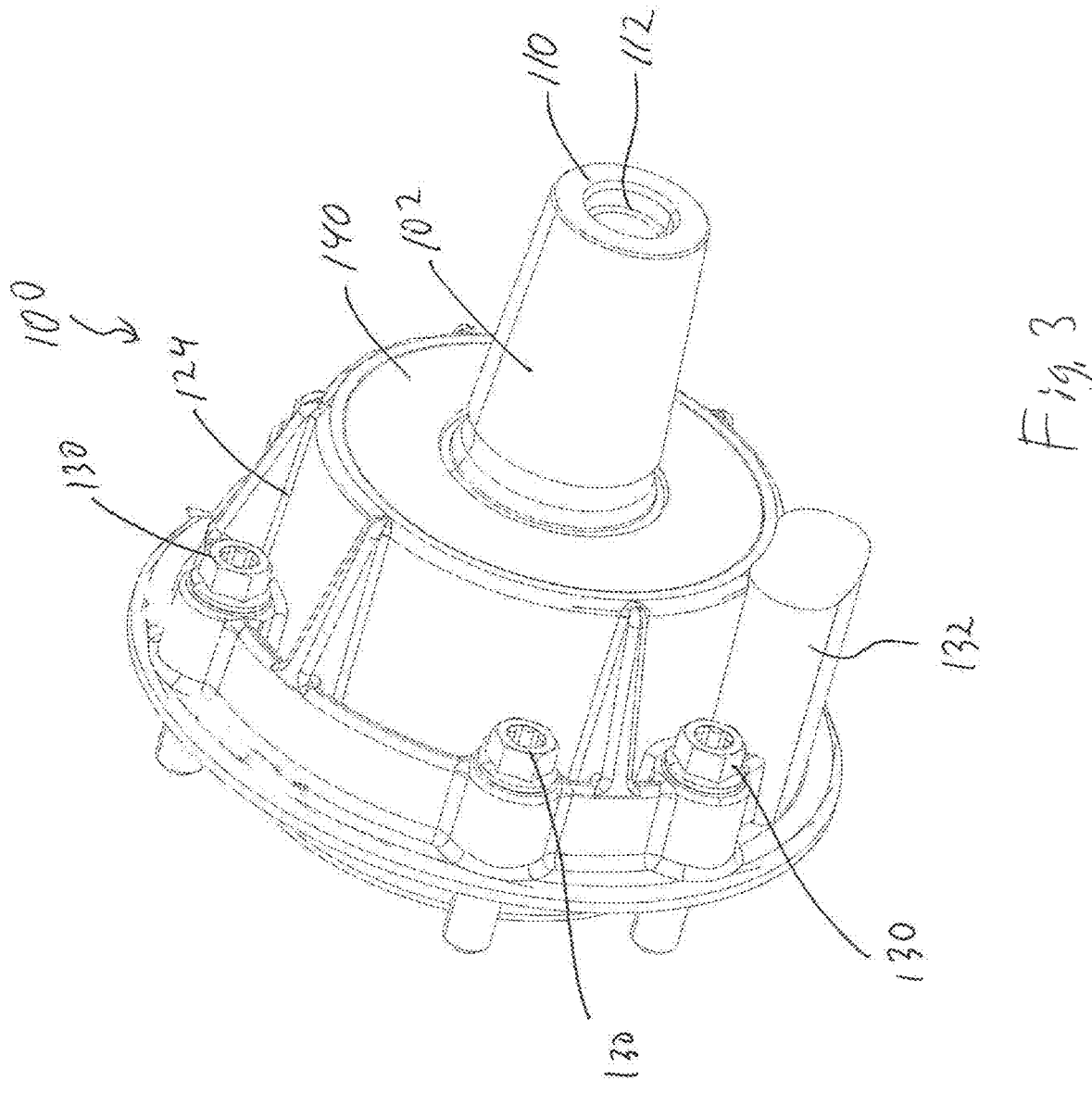
FIG. 3 is a perspective view taken from a front, left side of the output assembly of FIG. 1.
Figure 4:
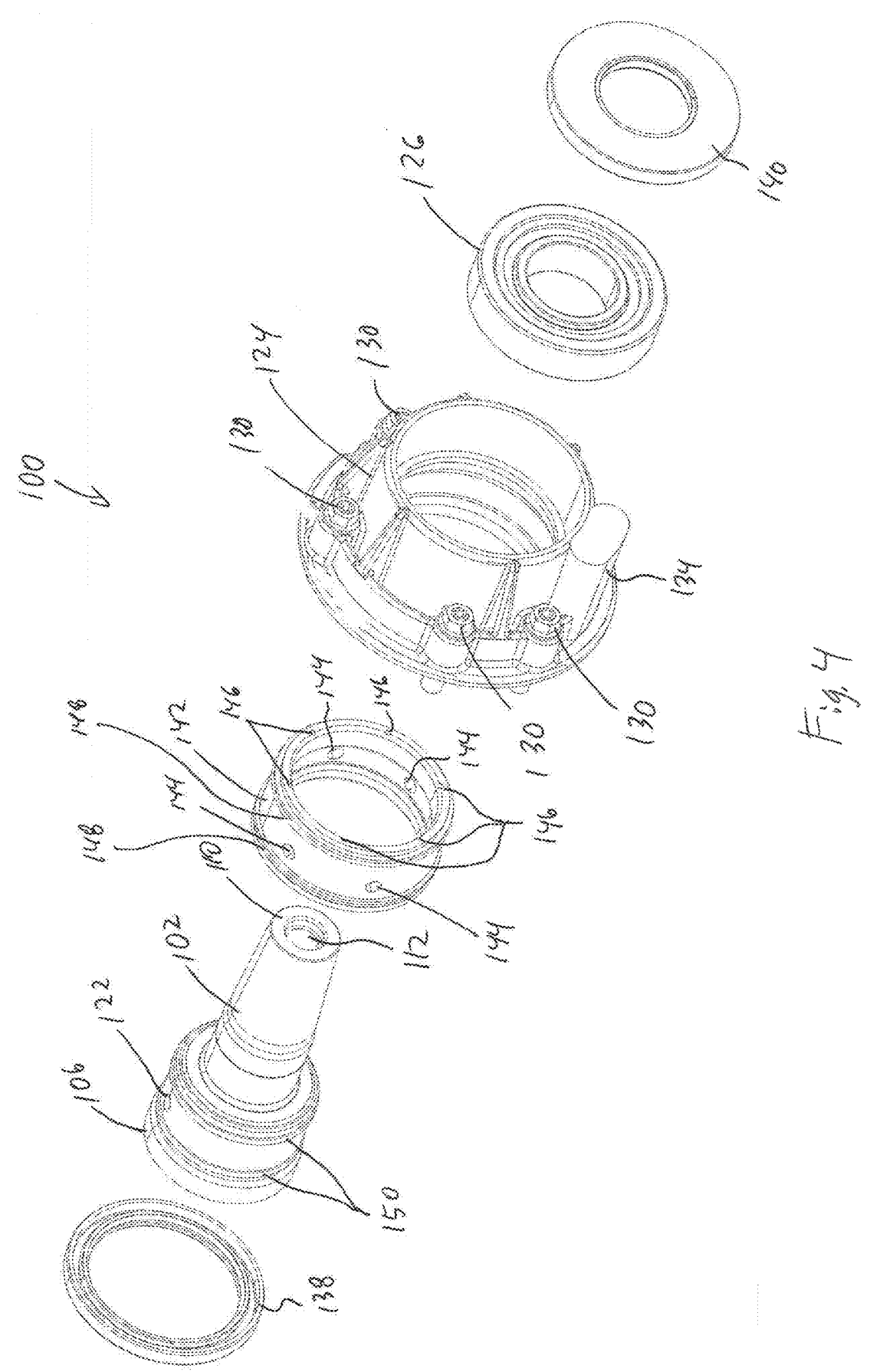
FIG. 4 is an exploded view of the output assembly of FIG. 3.
Figure 5:
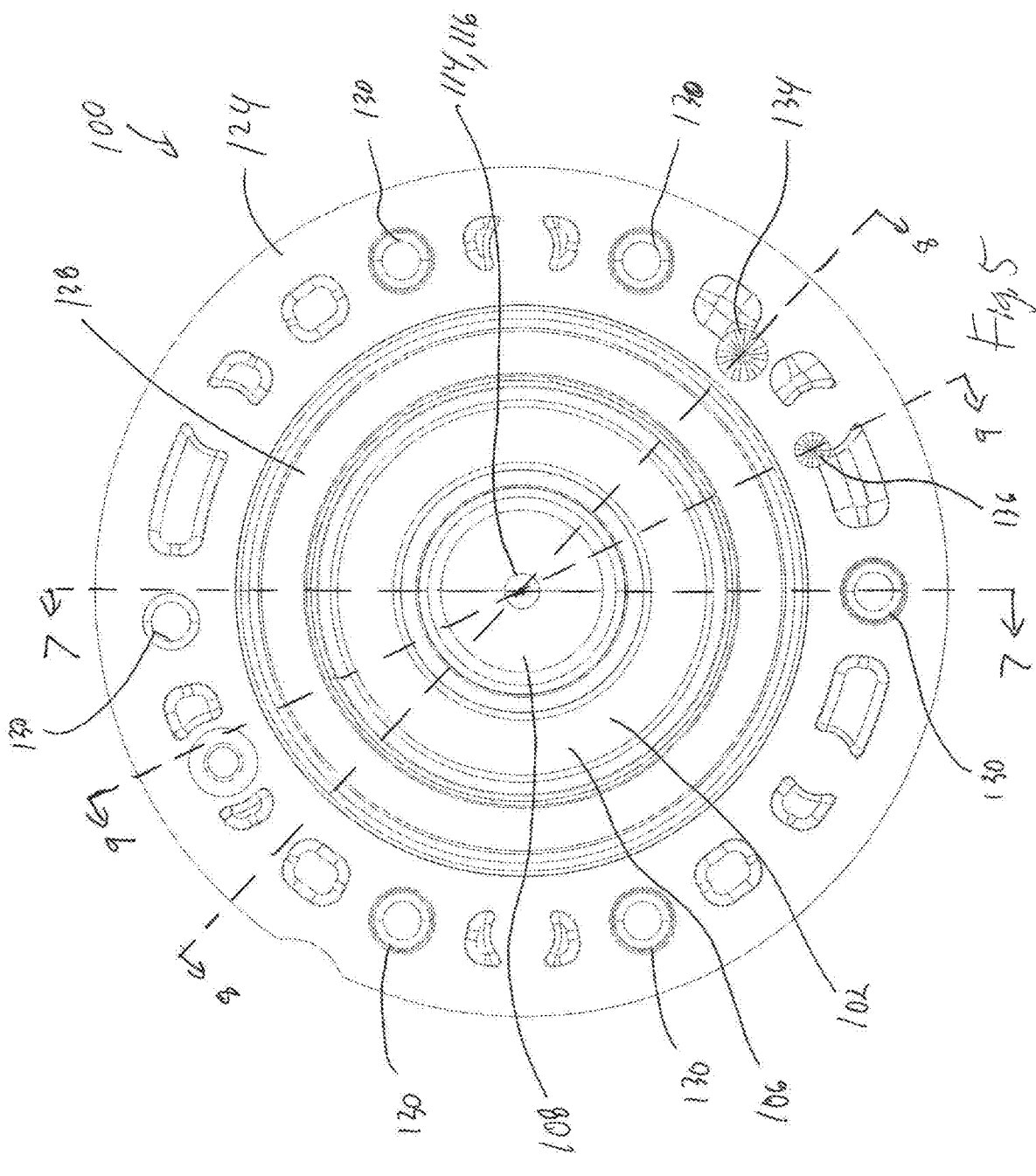
FIG. 5 is a right side elevation view of the output assembly of FIG. 3.
Figure 6:
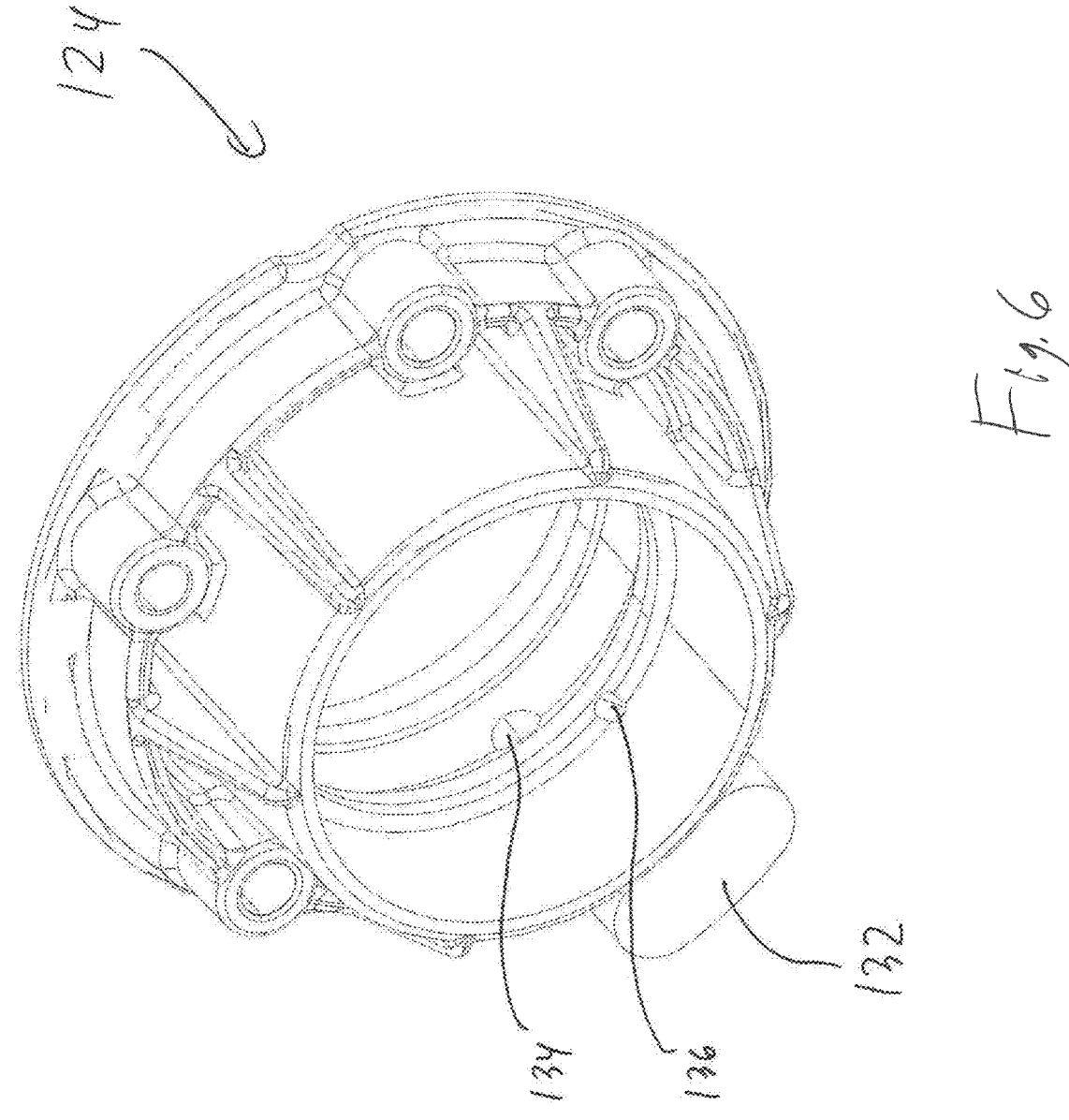
FIG. 6 is a perspective view taken from a rear left side of a cover of the output assembly of FIG. 3.

As can be seen in FIG. 2, the engine 12 has a crankshaft 26 that turns about a crankshaft rotation axis 28. In the present embodiment, the crankshaft 26 is an output shaft of the engine 12. It is contemplated that in alternative embodiments, the output shaft could be a separate shaft driven by the crankshaft 26. For example, in such embodiments, the output shaft could be coaxial with and be driven directly by the crankshaft or the output shaft could be parallel to the crankshaft 26 and be driven by the crankshaft 26 via gears or a chain and sprockets assembly. It is also contemplated that the output shaft could be perpendicular to the crankshaft 26 or be at some other angle relative to the crankshaft 26.

Figure 14:
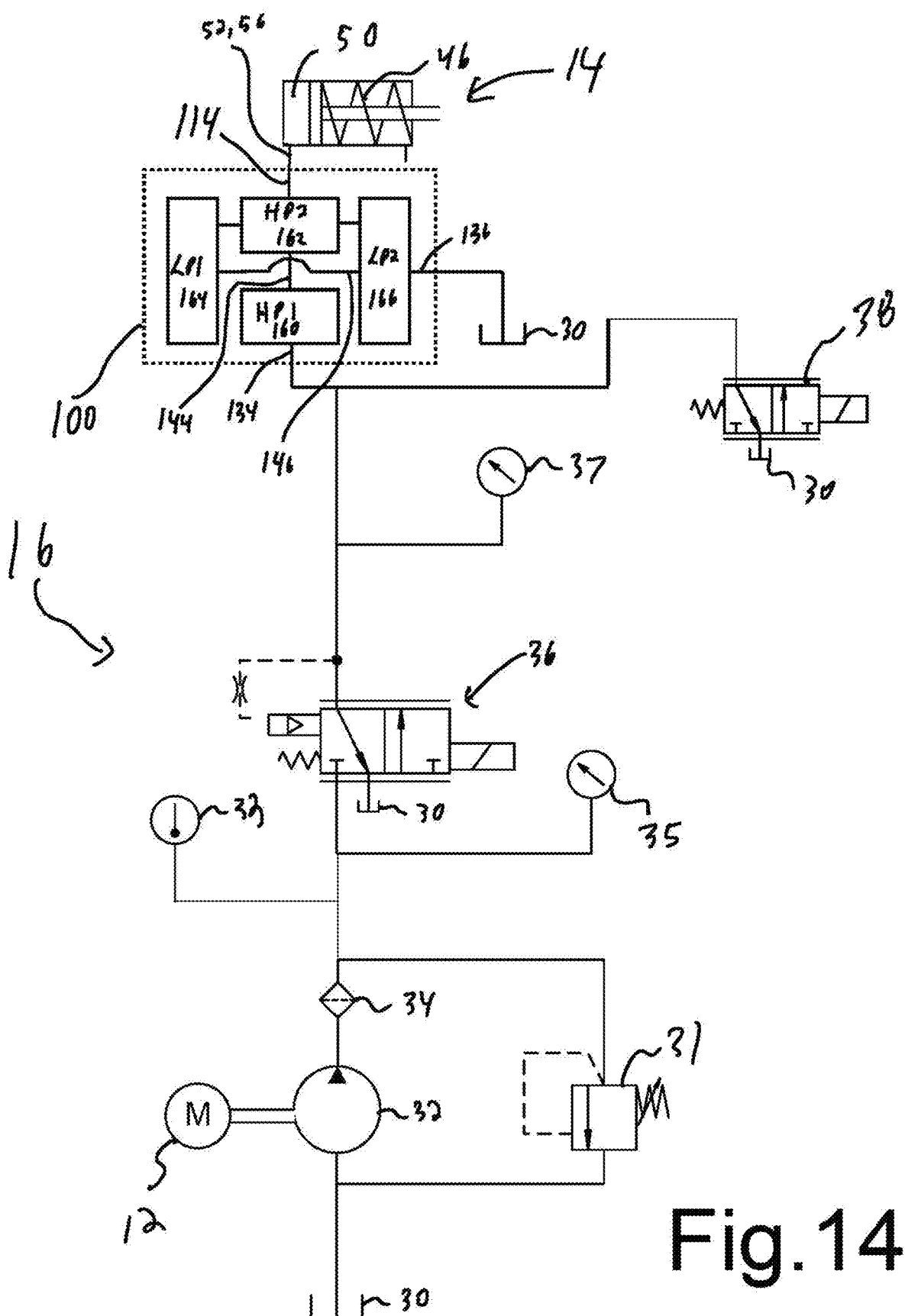
FIG. 14 is a schematic diagram of a hydraulic circuit of the motor assembly of FIG. 1.

The hydraulic fluid supply system 16 supplies hydraulic fluid to the output assembly 100 which then supplies the hydraulic fluid to the drive pulley 14. The hydraulic fluid supply system 16 also receives hydraulic fluid from the output assembly 100. The hydraulic fluid supply system 16 includes a hydraulic fluid reservoir 30, a pump 32, a hydraulic fluid filter 34, a valve 36, and a valve 38 (FIG. 14). The hydraulic reservoir 30 holds hydraulic fluid used in the hydraulic fluid supply system 16. The pump 32 is a gear pump mechanically driven by the crankshaft 26, but other types of pumps are contemplated. For example, it is contemplated that the pump 32 could be an electric pump. The hydraulic fluid filter 34 has a pleated filter element, but other types of filter elements are contemplated. The valve 36 is a proportional valve. Other types of valves are contemplated. It is also contemplated that more than one valve could be used instead of the proportional valve 36. The valve 38 is a two-position (i.e., on and off) valve. Other types of valves are contemplated. It is contemplated that the valve 38 could be omitted. With reference to FIG. 14, the hydraulic fluid supply system 16 also has a pressure relief valve 31 to prevent excessive hydraulic pressure in the system 16, a temperature sensor 33 for sensing a temperature of the hydraulic fluid in the system 16, and two pressure sensors 35, 37 for sensing hydraulic fluid pressure in the system 16. It is contemplated that the temperature sensor 33 and one of the pressure sensors 35, 37 could be omitted. It is contemplated that the hydraulic fluid supply system 16 could have a heat exchanger for cooling the hydraulic fluid in the system 16.

The drive pulley 14 is part of a continuously variable transmission (CVT). In addition to the drive pulley 14, the CVT includes a driven pulley (not shown) and a belt (not shown) disposed around the drive pulley 14 and the driven pulley to transfer torque between the drive pulley 14 and the driven pulley.

The drive pulley 14 includes a hollow drive pulley shaft 40, a fixed sheave 42, a movable sheave 44 and a spring 46. The drive pulley shaft 40 defines a drive pulley shaft rotation axis 48. In the present embodiment, the drive pulley shaft rotation axis 48 is coaxial with the crankshaft rotation axis 28. Therefore, the drive pulley shaft 40 is coaxial with the output shaft of the engine 12, which in the present embodiment is the crankshaft 26. The fixed sheave 42 is fixedly connected to the drive pulley shaft 40. In the present embodiment, the fixed sheave 42 is disposed between the movable sheave 44 and the engine 12. The movable sheave 44 is connected to the drive pulley shaft 40 and is movable axially along the drive pulley shaft 40. The spring 46 biases the movable sheave 44 away from the fixed sheave 42. The drive pulley 14 defines a drive pulley chamber 50. It is contemplated that the drive pulley 14 could define more than one drive pulley chamber 50. The drive pulley shaft 40 defines a drive pulley shaft passage 52 fluidly connected to the drive pulley chamber 50. The drive pulley 14 also has a bolt 54 disposed inside the drive pulley shaft 40 that fastens the drive pulley 14 to the output assembly 100. The bolt 54 defines a bolt passage 56 fluidly connected to the drive pulley shaft passage 52. Supplying hydraulic fluid to the drive pulley chamber 50 via the bolt passage 56 and the drive pulley shaft passage 52 causes the movable sheave 44 to move toward the fixed sheave 42. With the valve 36 in the proper position, as will be described in more detail below, the spring 46 pushes the movable sheave 44 away from the fixed sheave 42, causing hydraulic fluid to flow out of the drive pulley chamber 50, of the drive pulley shaft passage 52 and of the bolt passage 56. Additional details concerning the construction of the drive pulley 14 can be found in U.S. Pat. No. 8,998,755 B2, issued Apr. 7, 2015, the entirety of which is incorporated herein by reference, which describes a drive pulley similar to the drive pulley 14. It is contemplated that in alternative embodiments, in addition to or instead of the spring 46, the drive pulley 14 could define additional drive pulley chambers which, when supplied with hydraulic fluid, move the movable sheave 44 away from the fixed sheave 42.

Turning now to FIGS. 2 to 13, the output assembly 100 will be described in more detail. The output assembly 100 has a shaft 102 defining a rotation axis 104. In the present embodiment, as can be seen in FIG. 2, the rotation axis 104, the crankshaft rotation axis 28 and the drive pulley shaft rotation axis 48 are coaxial. As such, the shaft 102, the output shaft of the engine 12, which in the present embodiment is the crankshaft 26, and the drive pulley shaft 40 are coaxial. One end 106 of the shaft 102 connects to the crankshaft 26 such that the engine 12 drives the shaft 102. A cavity 108 is defined in the end 106 of the shaft 102 to receive the end of the crankshaft 26. In the present embodiment, the crankshaft 26 is press-fit in the cavity 108. It is contemplated that the end 106 of the shaft 102 could engage the crankshaft 26 differently. For example, the cavity 108 could define internal splines that engage external splines on the crankshaft 26 or the crankshaft 26 and the cavity 108 could have polygonal cross-sections. It is also contemplated that the crankshaft 26 and the shaft 102 could be integrally formed as a single shaft. An end 110 of the shaft 102, which is opposite to the end 106, connects to the drive pulley shaft 40 such that the shaft 102 drives the drive pulley shaft 40, and thereby the drive pulley 14. The end 110 of the shaft 102 is received inside the hollow drive pulley shaft 40. In the present embodiment, a cavity 112 is defined in the end 110 of the shaft 102 to receive the bolt 54. The cavity 112 is internally threaded to engage the externally threaded bolt 54. It is contemplated that the end 110 of the shaft 102 could engage the drive pulley shaft 40 by means other than the bolt 54. For example, the end 110 of the shaft 102 and the drive pulley shaft 40 could engage via splines.

The shaft 102 defines a shaft passage 114 for supplying hydraulic fluid to the drive pulley 14. More specifically, the shaft passage 114 fluidly connects to the bolt passage 56 of the bolt 54. The shaft passage 114 has an axial shaft passage section 116 that is coaxial with the rotation axis 104. An outlet 118 (FIG. 2) of the shaft passage 114 is defined at an end of the axial shaft passage section 116. In the present embodiment, the axial passage section 116 fluidly connects to the cavity 108, and the connection between the crankshaft 26 and the shaft 102 prevents hydraulic fluid that makes its way to the cavity 108 from flowing inside the engine 12. However, it is contemplated that the axial passage section 116 could not extend all the way to the cavity 108 or that the axial passage section 116 could be plugged to prevent fluid communication between the cavity 108 and the shaft passage 114. The shaft passage 114 also has two diagonal shaft passage sections 120 that extend from two inlets 122 of the shaft passage 114 to the axial shaft passage section 116. The inlets 122 are defined in the circumference of the shaft 102. It is contemplated that the shaft passage 114 could have only one or more than two diagonal shaft passage sections 120, with a corresponding number of inlets 122. It is also contemplated that the shaft passage sections 120 could extend radially instead of diagonally.

The output assembly 100 also has a cover 124 surrounding a portion of the shaft 102 and a bearing 126 disposed radially between the cover 124 and the shaft 102. The bearing 126 rotationally supports the shaft 102 in the cover 124. The bearing 126 abuts a shoulder 128 defined by the shaft 102. The bearing 126 is disposed axially between the shoulder 128 and the end 110 of the shaft 102. In the present embodiment, the bearing 126 is a tapered roller bearing, but other types of bearings are contemplated. It is also contemplated that there could be more than one bearing 126 rotationally supporting the shaft 102 in the cover 124.

Figure 7:
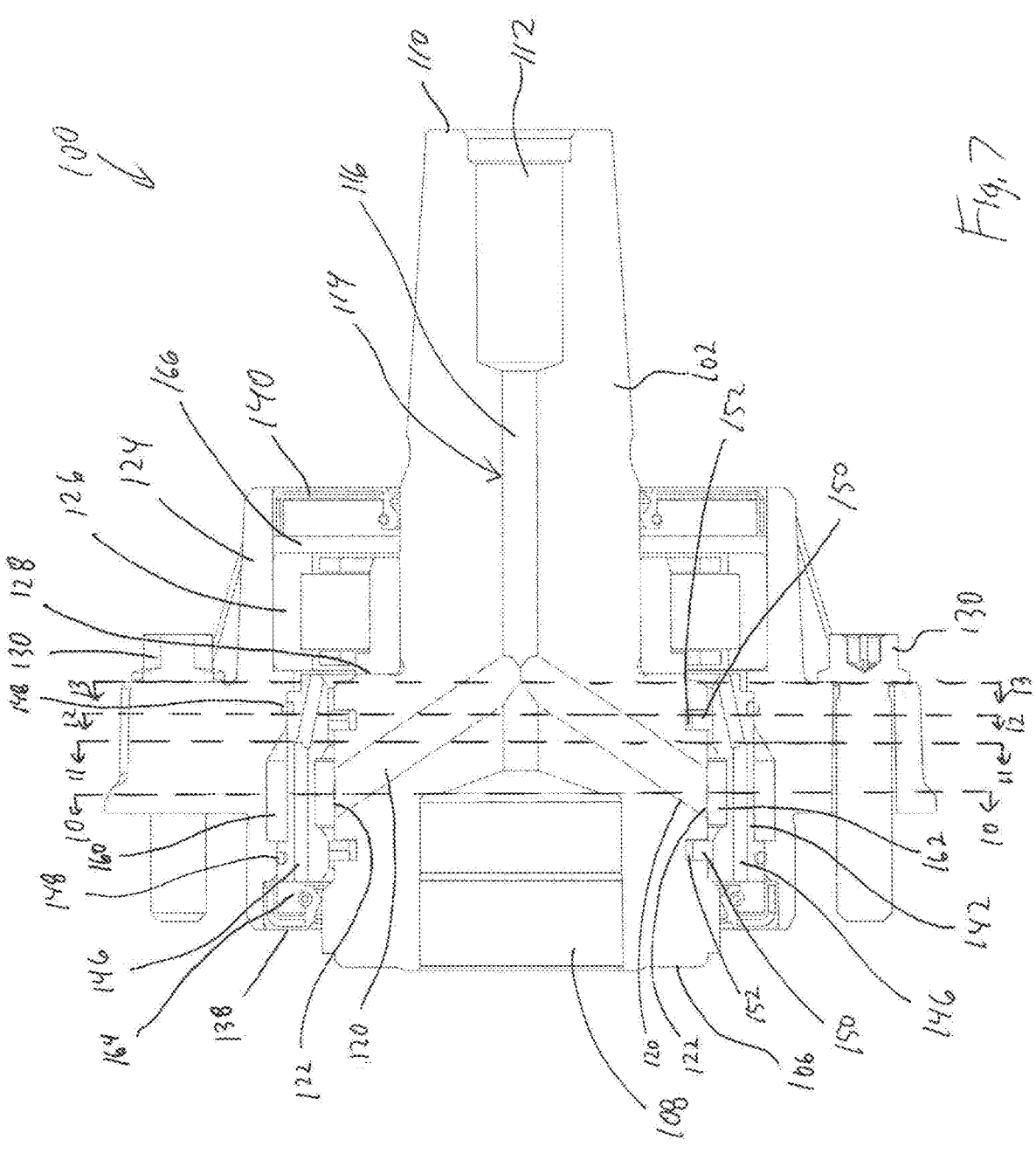
FIG. 7 is a cross-sectional view of the output assembly of FIG. 3 taken through line 7-7 of FIG. 5.

As can be seen in FIG. 7, both ends 106, 110 of the shaft 102 are disposed outside of the cover 124. As can be seen in FIG. 2, the cover 124 is fastened by bolts 130 to the engine 12, thereby connecting the output assembly 100 to the engine 12. It is contemplated that the cover 124 could be connected to the engine 12 by other means. The cover 124 has a protrusion 132. The cover 124 defines a cover inlet passage 134 and a cover outlet passage 136 that pass through the protrusion 132. As will be described in more detail below, the pump 32 is fluidly connected between the hydraulic fluid reservoir 30 and the cover inlet passage 134 and pumps hydraulic fluid from the hydraulic fluid reservoir 30 to the cover inlet passage 134, and the hydraulic fluid reservoir 30 is fluidly connected to the cover outlet passage 136 to receive hydraulic fluid from the cover outlet passage 136.

The output assembly 100 also has two shaft seals 138, 140 disposed radially between the ends of the cover 124 and the shaft 102. The shaft seals 138, 140 prevent the hydraulic fluid present inside the output assembly 100 from leaking out of the output assembly 100 between the ends of the cover 124 and the shaft 102. In the present embodiment, the shaft seals 138, 140 are rotary shaft seals.

Figure 10:
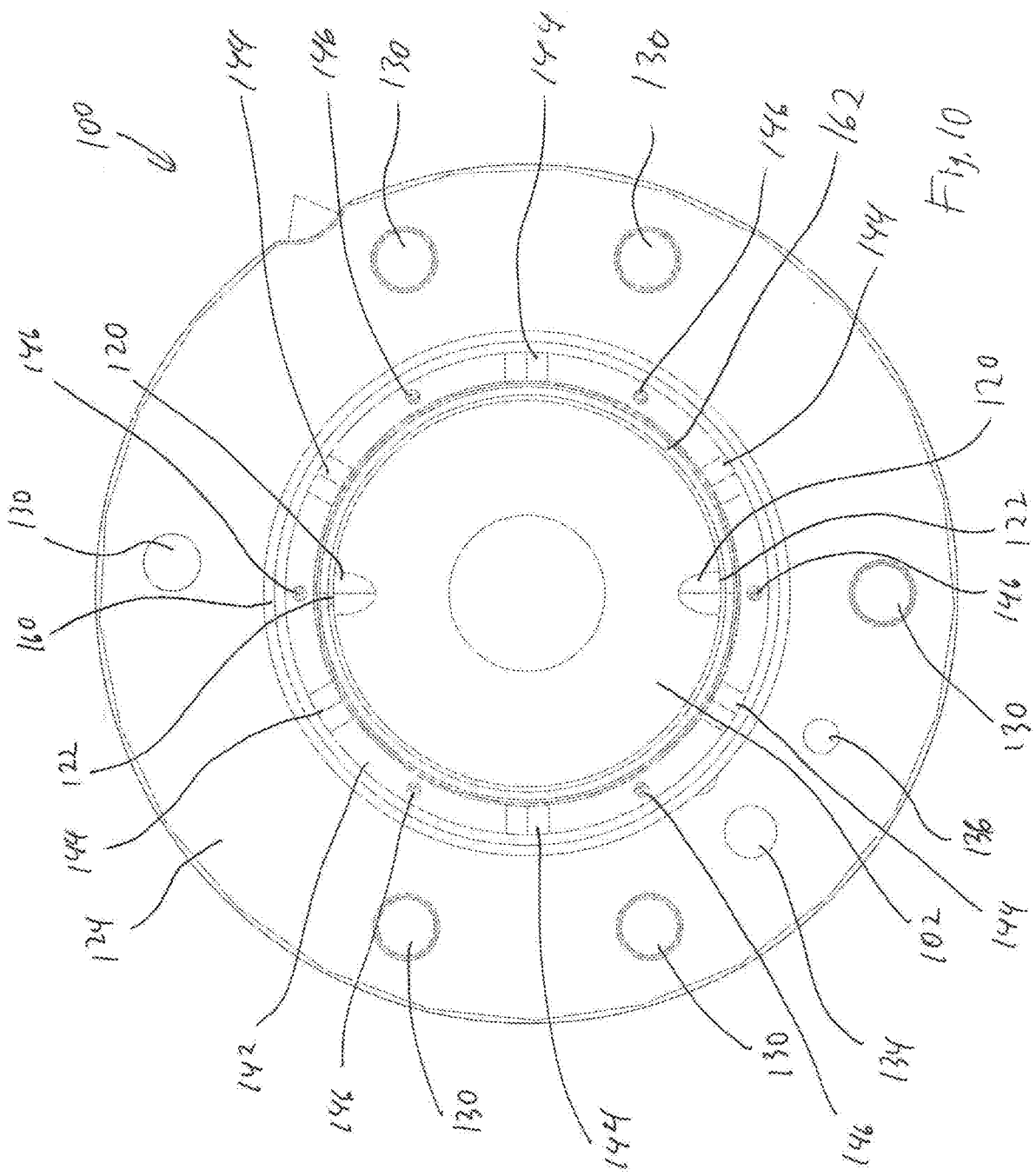
FIG. 10 is a cross-sectional view of the output assembly of FIG. 3 taken through line 10-10 of FIG. 7.
Figure 11:
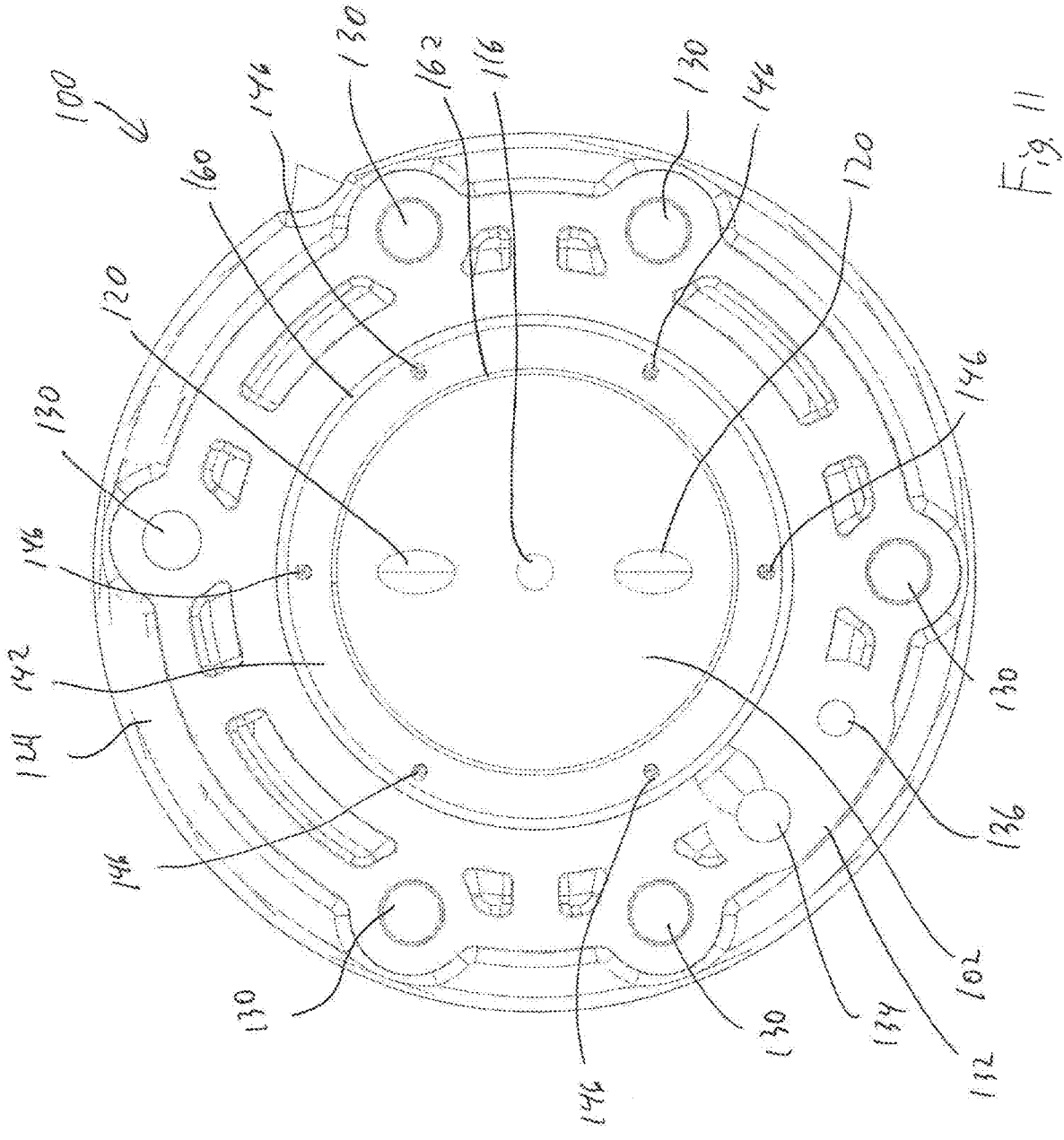
FIG. 11 is a cross-sectional view of the output assembly of FIG. 3 taken through line 11-11 of FIG. 7.
Figure 12:
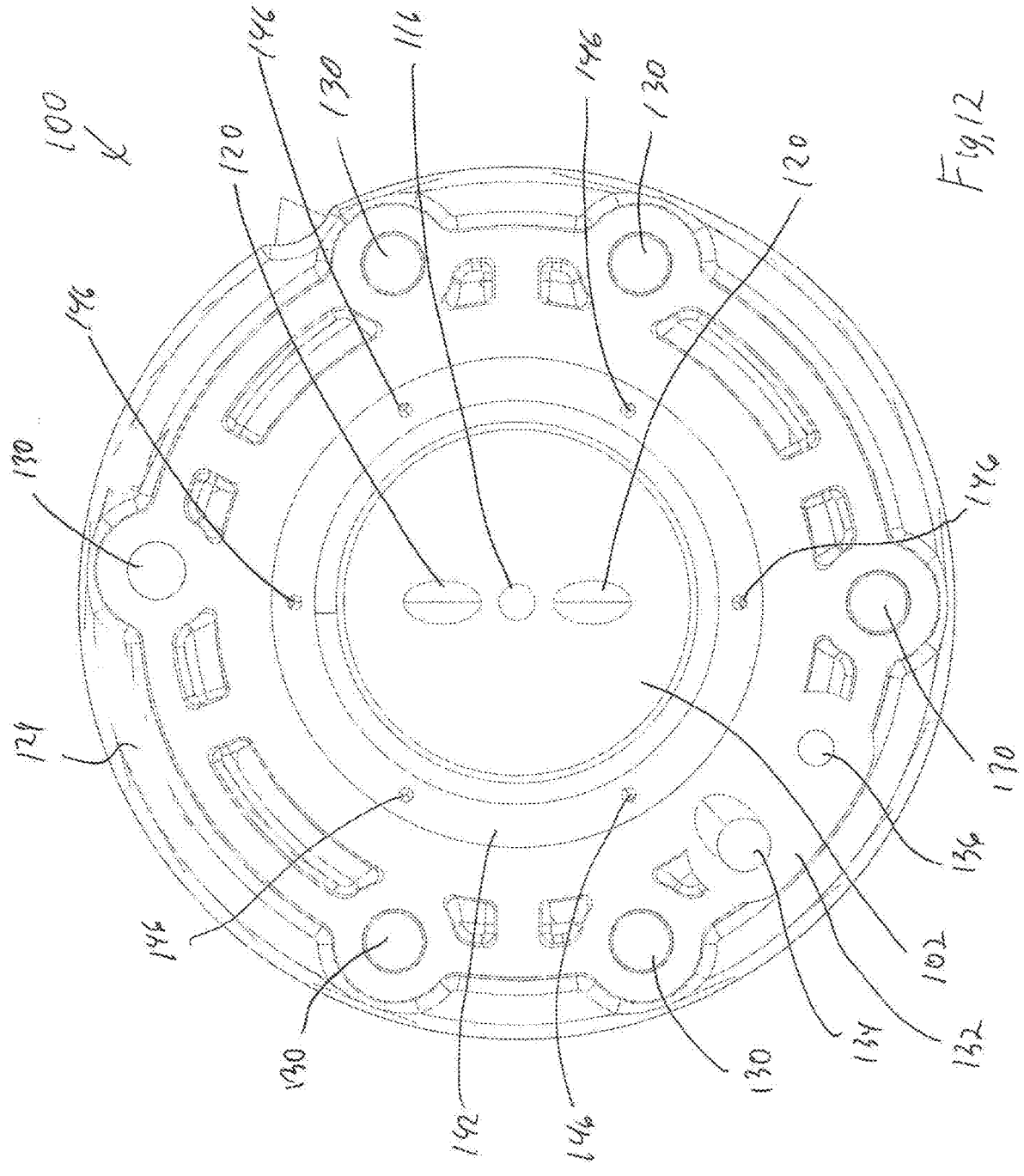
FIG. 12 is a cross-sectional view of the output assembly of FIG. 3 taken through line 12-12 of FIG. 7.
Figure 13:
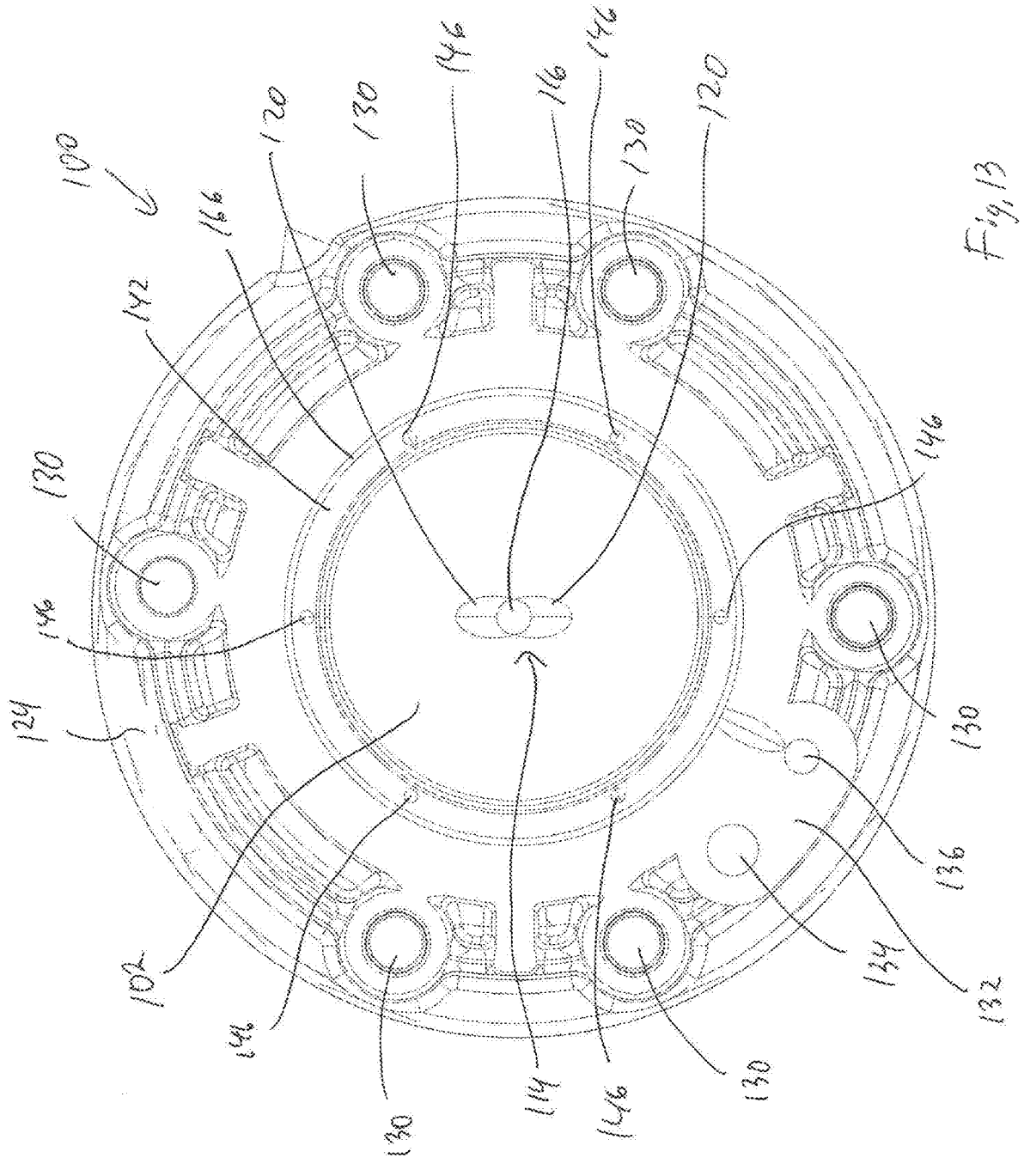
FIG. 13 is a cross-sectional view of the output assembly of FIG. 3 taken through line 13-13 of FIG. 7.

The output assembly 100 also has a sleeve 142 disposed in the cover 124 radially between the cover 124 and the shaft 102. The sleeve 142 is disposed axially between the two shaft seals 138, 140. As such, the shaft seal 140 is disposed axially between the sleeve 142 and the end 110 of the shaft 102. The sleeve 142 is rotationally fixed relative to the cover 124. The sleeve 142 abuts an inner side of the cover 124. In operation, the shaft 102 rotates relative to the sleeve 142. The sleeve 142 defines six sleeve passages 144 extending from an outside of the sleeve 142 to an inside of the sleeve 142. The sleeve passages 144 are aligned with each other in the axial direction defined by the rotation axis 104. The sleeve passages 144 are equally spaced from each other about the circumference of the sleeve 142. In the present embodiment, the sleeve passages 144 extend radially through the sleeve 142, but it is contemplated that the sleeve passages 144 could extend diagonally. It is contemplated that the sleeve 142 could define more or less than six sleeve passages 144. For example, it is contemplated that the sleeve 142 could define a single sleeve passage 144. The sleeve 142 also defines six sleeve passages 146 extending axially through the sleeve 142 from one end of the sleeve 142 to the other end of the sleeve 142. The sleeve passages 146 are equally spaced from each about the circumference of the sleeve 142. It is contemplated that the sleeve passages 146 could extend diagonally from one end of the sleeve 142 to the other end of the sleeve 146. It is contemplated that the sleeve 142 could define more or less than six sleeve passages 146. For example, it is contemplated that the sleeve 142 could define a single sleeve passage 146. It is also contemplated that in some embodiments, the sleeve passages 146 could be omitted. As best seen in FIG. 10, the passages 144 and 146 alternate around the sleeve 142, with each passage 144 being angularly offset from an adjacent passage 146 by 30 degrees. As can also be seen in FIG. 10, the passages 146 have a smaller diameter than the passages 144.

The output assembly 100 has two sealing rings 148 disposed radially between the cover 124 and the sleeve 142. The two sealing rings 148 are received in two grooves defined in the circumference of the sleeve 142. In the present embodiment, the sealing rings 148 are O-rings, but other types of sealing rings are contemplated. The output assembly 100 also has two rings 150 disposed radially between the sleeve 142 and the shaft 102. The two rings 150 are received in two grooves 152 defined in the circumference of the shaft 102. The rings 150 abut an inside of the sleeve 142, but are not rotationally fixed relative to the sleeve 142. The rings 150 are spaced from a bottom of the grooves 152. As the shaft 102 rotates, the rings 150 can rotate relative to the shaft 102 and/or the sleeve 142. In the present embodiment, the sealing rings 150 are flat rings similar in shape to piston rings, but other types of rings are contemplated. In the present embodiment, the rings 150 are made from polytetrafluoroethylene (PTFE) or nylon, but other materials are contemplated.

The output assembly 100 defines two high pressure chambers 160, 162 and two low pressure chambers 164, 166. The high pressure chambers 160, 162 are referred to as such since the pressure of the hydraulic fluid therein can reach the high pressures necessary to move the movable sheave 44 of the drive pulley 14 toward the fixed sheave 42. In some embodiments, the hydraulic fluid in the high pressure chambers 160, 162 can reach pressures of up to 17 bar, but alternative embodiments may reach higher or lower pressures. The low pressure chambers 164, 166 are referred to as such since the pressure of the hydraulic fluid therein is lower than the pressure in the high pressure chambers 160, 162. As such, the terms "high" and "low" used to name the pressure chambers 160, 162, 164, 166 should be understood as relative terms with regard to the magnitudes of the pressures in the pressure chambers 160, 162, 164, 166. In embodiments where the hydraulic fluid in the high pressure chambers 160, 162 can reach pressures of up to 17 bar, the hydraulic pressure in the low pressure chambers 164, 166 is about 1 bar, but alternative embodiments may have a different pressure in the low pressure chambers 164, 166. In some embodiments, the hydraulic pressure in the low pressure chambers 164, 166 is at least 80% lower than the hydraulic pressure in the high pressure chambers 160, 162. In other embodiments, the hydraulic pressure in the low pressure chambers 164, 166 is at least 90% lower than the hydraulic pressure in the high pressure chambers 160, 162. The pressure chambers 160, 162, 164, 166 are each generally annular. As the pressure of hydraulic fluid in the low pressure chambers 164, 166 is lower than the pressure of hydraulic fluid in the high pressure chambers 160, 162, the shaft seals 138, 140 only need to be rated for the lower pressure of the low pressure chambers 164, 166.

Figure 8:
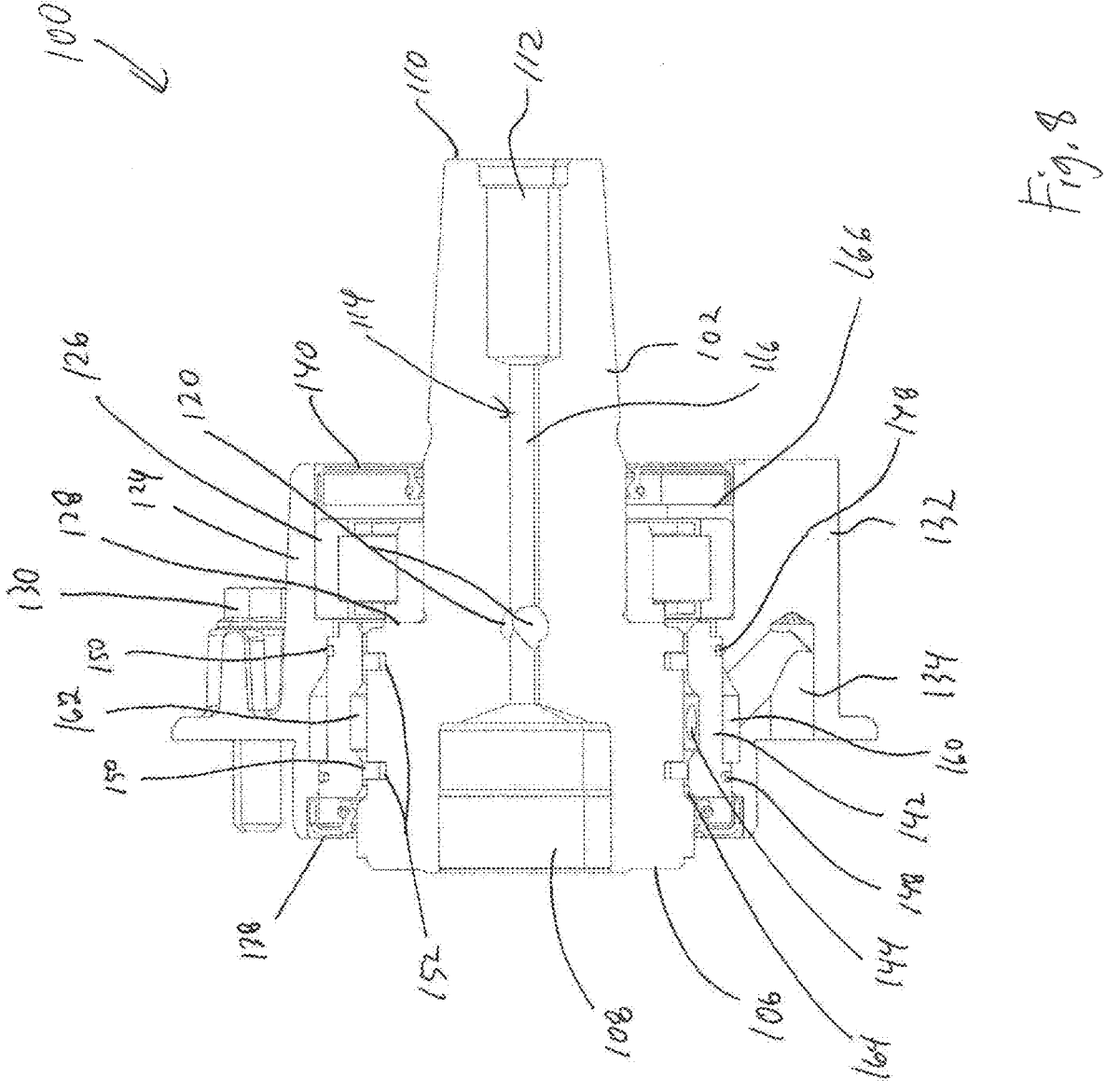
FIG. 8 is a cross-sectional view of the output assembly of FIG. 3 taken through line 8-8 of FIG. 5.
Figure 9:
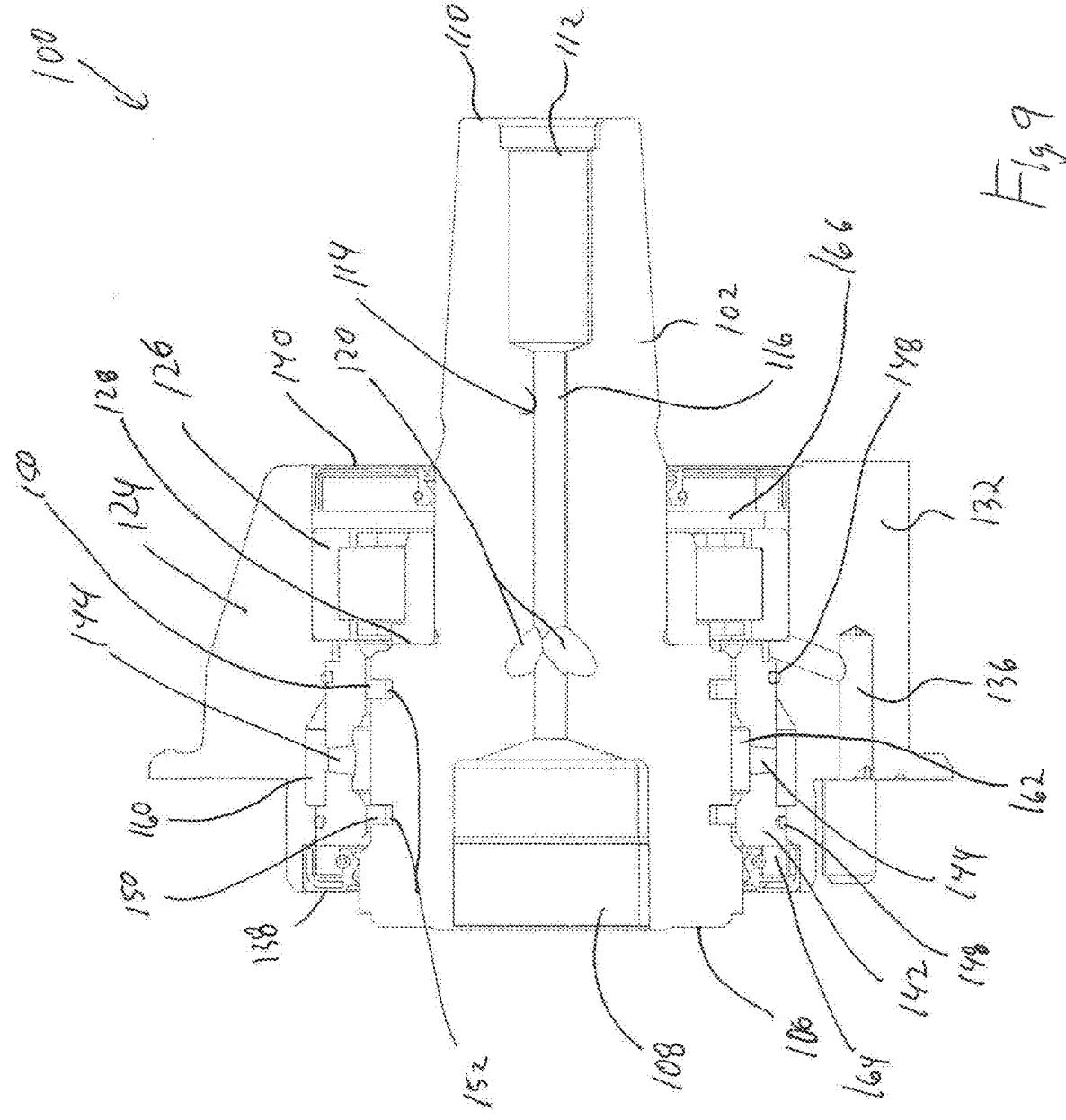
FIG. 9 is a cross-sectional view of the output assembly of FIG. 3 taken through line 9-9 of FIG. 5.

The high pressure chamber 160 is defined radially between the cover 124 and the sleeve 142. The high pressure chamber 160 is disposed axially between the two sealing rings 148. As best seen in FIG. 8, the cover inlet passage 134 is fluidly connected to a lower portion of the high pressure chamber 160. The high pressure chamber 162 is defined radially between the sleeve 142 and the shaft 102. The high pressure chamber 162 is disposed axially between the two rings 150. As best seen in FIG. 7, the inlets 122 of the shaft passage 114 open into the high pressure chamber 162 and fluidly communicate the high pressure chamber 162 with the shaft passage 114. As best seen in FIGS. 9 and 10, the sleeve passages 144 fluidly communicate the high pressure chamber 160 with the high pressure chamber 162.

The low pressure chamber 164 is defined radially between the cover 124 and the shaft 102 and is defined axially between the sleeve 142 and the shaft seal 138. The low pressure chamber 164 fluidly communicates with the high pressure chamber 162 via the small gap provided by the ring 150 disposed axially between the chambers 162, 164. As hydraulic fluid flows over the ring 150 from the high pressure chamber 162 to the low pressure chamber 164, the pressure of the hydraulic fluid drops. The low pressure chamber 166 is defined radially between the cover 124 and the shaft 102 and is defined axially between the sleeve 142 and the shaft seal 140. The low pressure chamber 166 fluidly communicates with the high pressure chamber 162 via the small gap provided by the ring 150 disposed axially between the chambers 162, 166. As hydraulic fluid flows over the ring 150 from the high pressure chamber 162 to the low pressure chamber 166, the pressure of the hydraulic fluid drops. As best seen in FIG. 9, the cover outlet passage 136 is fluidly connected to a lower portion of the low pressure chamber 166. The bearing 126 is disposed in the low pressure chamber 166 axially between the sleeve 142 and the shaft seal 140. The hydraulic fluid in the low pressure chamber 166 lubricates the bearing 126. As best seen in FIG. 7, the low pressure chamber 164 fluidly communicates with the low pressure chamber 166 via the sleeve passages 146. It is contemplated that instead of the sleeve passages 146, one or more passages defined in the cover 124 could fluidly communicate the low pressure chamber 164 with the low pressure chamber 166. It is also contemplated that in some embodiments, one of the two low pressure chambers 164, 166 could be omitted.

Turning now to FIG. 14, the operation of the drive pulley 14, the hydraulic fluid supply system 16, and the output assembly 100 will be described.

In order to move the movable sheave 44 of the drive pulley 14 toward the fixed sheave 42, the valve 36 is opened to increase the supply of hydraulic fluid to the output assembly 100. The pump 32 supplies hydraulic fluid from the reservoir 30 to the hydraulic fluid filter 34. From the hydraulic fluid filter 34, hydraulic fluid flows through the valve 36, and from the valve 36 to the cover inlet passage 134 of the output assembly 100. From the cover inlet passage 134, the hydraulic fluid flows to the high pressure chamber 160. From the high pressure chamber 160, the hydraulic fluid flows to the high pressure chamber 162 via the sleeve passages 144. From the high pressure chamber 162, a portion of the hydraulic fluid flows to the shaft passage 114 via the inlets 122 of the shaft passage 114, and another portion of the hydraulic fluid flows over the rings 150 to the low pressure chambers 164, 166. In the present embodiment, a majority of the hydraulic fluid flows from the high pressure chamber 162 to the shaft passage 114 and a small portion of the hydraulic fluid flows to the low pressure chambers 164, 166. From the low pressure chamber 164, hydraulic fluid flows to the low pressure chamber 166 via the sleeve passage 146. From the low pressure chamber 166, hydraulic fluid flows back to the hydraulic fluid reservoir 30 via the cover outlet passage 136. From the shaft passage 114, the hydraulic fluid flows to the bolt passage 56 of the bolt 54 of the drive pulley 14, and from the bolt passage 56 to the drive pulley shaft passage 52 of the drive pulley shaft 40. From the drive pulley shaft passage 52, the hydraulic fluid is supplied to the drive pulley chamber 50. As the hydraulic fluid pressure inside the drive pulley chamber 50 increases, the movable sheave 44 moves toward the fixed sheave 42 and the spring 46 is compressed. When the movable sheave 44 reaches the desired position, valve 36 is partially closed to reduce the supply of hydraulic fluid to the output assembly 100. The degree of opening of the valve 36 should be such that the flow of hydraulic fluid to the output assembly 100 equals the flow of hydraulic fluid out of the output assembly 100 to the hydraulic fluid reservoir 30 via the cover outlet passage 136. As a result, the movable sheave 44 stays in position.

In order to move the movable sheave 44 away from the fixed sheave 42, the valve 36 is moved to the position shown in FIG. 14, opening a flow path to the hydraulic fluid reservoir 30. As the pump 32 is driven by the engine 12, it continues to pump hydraulic fluid, and the pressure relief valve 31 opens to return the hydraulic fluid to the hydraulic fluid reservoir 30. As a result of the valve 36 moving to the position shown in FIG. 14, the spring 46 expands and pushes the movable sheave 44 away from the fixed sheave 42. As the movable sheave 44 moves away from the fixed sheave 42, the hydraulic fluid in the drive pulley chamber 50 is pushed out of the drive pulley chamber 50, and flows back through the drive pulley shaft passage 52 and the bolt passage 56. From the bolt passage 56, the hydraulic fluid flows to the high pressure chamber 162. From the high pressure chamber 162, a portion of the hydraulic fluid flows to the high pressure chamber 160 and another portion of the hydraulic fluid flows over the rings 150 to the low pressure chambers 164, 166. In the present embodiment, a majority of the hydraulic fluid flows from the high pressure chamber 162 to the high pressure chamber 160 and a small portion of the hydraulic fluid flows to the low pressure chambers 164, 166. From the low pressure chamber 164, hydraulic fluid flows to the low pressure chamber 166 via the sleeve passage 146. From the low pressure chamber 166, hydraulic fluid flows back to the hydraulic fluid reservoir 30 via the cover outlet passage 136. From the high pressure chamber 160, hydraulic fluid flows back to the hydraulic fluid reservoir 30 via the cover inlet passage 134 and the valve 36. Should the movable sheave 44 need to move away from the fixed sheave 42 quickly, such as when the operator of a vehicle provided with the motor assembly 10 suddenly brakes, the valve 38, which is normally closed, opens, thereby providing an additional path to the hydraulic fluid reservoir 30 for the hydraulic fluid exiting the output assembly 100 via the cover inlet passage 134. As a result of the additional path to the hydraulic fluid reservoir 30 provided by the valve 38, the hydraulic fluid can leave the drive pulley chamber 50 more quickly, and the movable sheave 44 can move away from the fixed sheave 42 more quickly than if only the flow path through the valve 36 was provided. When the movable sheave 44 reaches the desired position, if the valve 38 was opened, it is closed, and the valve 36 is slightly opened to supply some hydraulic fluid to the output assembly 100. The degree of opening of the valve 36 should be such that the flow of hydraulic fluid to the output assembly 100 equals the flow of hydraulic fluid out of the output assembly 100 to the hydraulic fluid reservoir 30 via the cover outlet passage 136. As a result, the movable sheave 44 stays in position.

Modifications and improvements to the above-described embodiments of the present invention may become apparent to those skilled in the art. The foregoing description is intended to be exemplary rather than limiting. The scope of the present technology is therefore intended to be limited solely by the appended claims.

What is claimed is:

1. An output assembly for driving a drive pulley of a continuously variable transmission and for supplying hydraulic fluid to the drive pulley for actuating the drive pulley, the output assembly comprising:
    a shaft defining a rotation axis, the shaft comprising:
        a first end configured to connect to an output shaft of a motor for being driven by the output shaft; and
        a second end configured to connect to the drive pulley for driving the drive pulley,
    the shaft defining a shaft passage for supplying hydraulic fluid to the drive pulley, the shaft passage having at least one inlet defined in a circumference of the shaft;
    a cover surrounding a portion of the shaft, the cover defining a cover inlet passage and a cover outlet passage, the second end of the shaft being disposed outside the cover;
    a bearing disposed in the cover radially between the cover and the shaft, the bearing rotationally supporting the shaft in the cover;
    a sleeve disposed in the cover radially between the cover and the shaft, the sleeve being rotationally fixed relative to the cover, the sleeve defining at least one sleeve passage extending from an outside of the sleeve to an inside of the sleeve;
    a first shaft seal disposed radially between the cover and the shaft;
    a second shaft seal disposed radially between the cover and the shaft, the second shaft seal being disposed axially between the sleeve and the second end of the shaft, the sleeve being disposed axially between the first shaft seal and the second shaft seal;
    a first high pressure chamber defined radially between the cover and the sleeve, the cover inlet passage fluidly communicating with the first high pressure chamber;
    a second high pressure chamber defined radially between the sleeve and the shaft, the at least one sleeve passage fluidly communicating the first high pressure chamber with the second high pressure chamber, the at least one inlet of the shaft passage fluidly communicating with the second high pressure chamber; and
    a low pressure chamber defined radially between the cover and the shaft and axially between the sleeve and one of the first shaft seal and the second shaft seal, the second high pressure chamber fluidly communicating with the low pressure chamber, the cover outlet passage fluidly communicating with the low pressure chamber,
    in operation:
        hydraulic fluid flowing from the cover inlet passage to the first high pressure chamber, and from the first high pressure chamber to the second high pressure chamber via the at least one sleeve passage;
        a portion of hydraulic fluid in the second high pressure chamber flowing to the shaft passage via the at least one inlet of the shaft passage, and from the shaft passage to the drive pulley; and another portion of hydraulic fluid in the second high pressure chamber flowing to the low pressure chamber, and from the low pressure chamber to the cover outlet passage.

2. The output assembly of claim 1, wherein the shaft passage has:

a first shaft passage section coaxial with the rotation axis; and at least one second shaft passage section extending from the at least one inlet of the shaft passage to the first shaft section.

3. The output assembly of claim 2, wherein:

the shaft passage has an outlet defined at an end of the first shaft passage section;

the at least one inlet of the shaft passage is a plurality of inlets; and the at least one second shaft passage section is a plurality of second shaft passage sections.

4. The output assembly of claim 1, wherein the bearing is disposed axially between the sleeve and the second shaft seal.

5. The output assembly of claim 4, wherein the bearing is disposed in the low pressure chamber.

6. The output assembly of claim 1, further comprising two sealing rings disposed radially between the cover and the sleeve, the first high pressure chamber being disposed axially between the two sealing rings.

7. The output assembly of claim 1, further comprising two rings disposed radially between the sleeve and the shaft, the second high pressure chamber being disposed axially between the two rings.

8. The output assembly of claim 1, wherein:

the low pressure chamber is a second low pressure chamber disposed axially between the sleeve and the second shaft seal, the second high pressure chamber fluidly communicates with the second low pressure chamber, the cover outlet passage fluidly communicates with the second low pressure chamber;

the output assembly further comprises a first low pressure chamber defined radially between the cover and the shaft and axially between the sleeve and the first shaft seal, the second high pressure chamber fluidly communicates with the first low pressure chamber, the cover outlet passage fluidly communicates with the first low pressure chamber; and in operation, the other portion of hydraulic fluid in the second high pressure chamber flows to the first low pressure chamber and to the second low pressure chamber, and from the first low pressure chamber and the second low pressure chamber to the cover outlet passage.

9. The output assembly of claim 8, wherein the first low pressure chamber fluidly communicates with the cover outlet passage via the second low pressure chamber.

10. The output assembly of claim 9, wherein:

the at least one sleeve passage is at least one first sleeve passage;

the sleeve defines at least one second sleeve passage extending axially through the sleeve; and the at least one second sleeve passage fluidly communicates the first low pressure chamber with the second low pressure chamber.

11. The output assembly of claim 8, wherein the bearing is disposed in the second low pressure chamber.

12. The output assembly of claim 8, further comprising:

a first ring disposed radially between the sleeve and the shaft, the first ring being disposed axially between the second high pressure chamber and the first low pressure chamber; and a second ring disposed radially between the sleeve and the shaft, the second ring being disposed axially between the second high pressure chamber and the second low pressure chamber;

wherein:

the second high pressure chamber is disposed axially between the two rings; and in operation, the other portion of hydraulic fluid in the second high pressure chamber flows over the first ring to the first low pressure chamber and over the second ring to the second low pressure chamber.

13. A motor assembly comprising:

a motor having an output shaft;

the output assembly of claim 1, the output shaft being operatively connected to the shaft of the output assembly; and a drive pulley operatively connected to the shaft of the output assembly, the drive pulley defining at least one drive pulley chamber fluidly connected to the shaft passage of the output assembly for receiving hydraulic fluid from the shaft passage.

14. The motor assembly of claim 13, further comprising:

a hydraulic fluid reservoir fluidly connected to the cover outlet passage for receiving hydraulic fluid from the cover outlet passage; and a pump fluidly connected to the hydraulic fluid reservoir and to the cover inlet passage for pumping hydraulic fluid from the hydraulic fluid reservoir to the cover inlet passage.

15. The motor assembly of claim 13, wherein the drive pulley comprises:

a drive pulley shaft operatively connected to the shaft of the output assembly;

a fixed sheave fixedly connected to the drive pulley shaft; and a movable sheave connected to the drive pulley shaft and being movable axially along the drive pulley shaft;

wherein hydraulic fluid supplied to the at least one drive pulley chamber from the shaft passage of the output assembly moves the movable sheave toward the fixed sheave.

16. The motor assembly of claim 15, wherein the drive pulley further comprises a spring biasing the movable sheave away from the fixed sheave.

17. The motor assembly of claim 15, wherein the output shaft, the shaft of the output assembly and the drive pulley shaft are coaxial.

18. The motor assembly of claim 15, wherein the fixed sheave is disposed between the movable sheave and the motor.

19. The motor assembly of claim 13, wherein the cover of the output assembly is fastened to the motor.

20. The motor assembly of claim 13, wherein:

the motor is an internal combustion engine; and the output shaft is a crankshaft of the internal combustion engine.

* * * * *